United States Patent
Greenhill et al.

(10) Patent No.: US 11,278,970 B2
(45) Date of Patent: Mar. 22, 2022

(54) DRILL BIT

(71) Applicant: MILWAUKEE ELECTRIC TOOL CORPORATION, Brookfield, WI (US)

(72) Inventors: Alexander R. Greenhill, Wauwatosa, WI (US); Brett A. Parendo, Milwaukee, WI (US); David Hlavac, Germantown, WI (US); WeiJie Wu, Luo Ding (CN); Gang Huang, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/594,622

(22) Filed: Oct. 7, 2019

(65) Prior Publication Data

US 2020/0108451 A1    Apr. 9, 2020

(30) Foreign Application Priority Data

Oct. 9, 2018 (CN) .......................... 201821636987.6

(51) Int. Cl.
    *B23B 51/02*      (2006.01)

(52) U.S. Cl.
    CPC .......... *B23B 51/02* (2013.01); *B23B 2251/04* (2013.01)

(58) Field of Classification Search
    CPC .......... B23B 2251/04; B23B 2251/043; B23B 2251/404; B23B 2251/60; B23B 51/02; B23B 51/009; B23B 2229/08; B23B 2229/12
See application file for complete search history.

(56) References Cited

U.S. PATENT DOCUMENTS

| | | | |
|---|---|---|---|
| 4,044,439 A | 8/1977 | Romagnolo | |
| 4,968,193 A * | 11/1990 | Chaconas | C11D 3/0063 408/211 |
| 5,288,183 A * | 2/1994 | Chaconas | B23B 51/02 408/211 |
| 5,800,100 A | 9/1998 | Krenzer | |
| 5,853,267 A | 12/1998 | Satran et al. | |

(Continued)

FOREIGN PATENT DOCUMENTS

| | | |
|---|---|---|
| CN | 2863328 Y | 1/2007 |
| CN | 2875659 Y | 3/2007 |

(Continued)

*Primary Examiner* — Nicole N Ramos
(74) *Attorney, Agent, or Firm* — Michael Best & Friedrich LLP

(57) ABSTRACT

A drill bit includes a body having a first end, a second end, and an axis of rotation extending centrally through the body from the first end to the second end. The drill bit also includes a shank adjacent the second end. The drill bit further includes a cutting head adjacent the first end. The cutting head includes a pilot tip and a cutting portion. The cutting portion has first tip surfaces and second tip surfaces on opposite sides of the pilot tip. Each first tip surface extends radially outward from the pilot tip to a corresponding second tip surface. The first tip surfaces define a first tip angle through the axis of rotation that is less than 180 degrees. The second tip surfaces define a second tip angle through the axis of rotation that is smaller than the first tip angle.

18 Claims, 2 Drawing Sheets

(56) References Cited

U.S. PATENT DOCUMENTS

| | | | |
|---|---|---|---|
| 6,050,754 A * | 4/2000 | Thomas | B23B 51/02 408/224 |
| 6,126,367 A * | 10/2000 | Reed | B23B 51/02 408/1 R |
| 6,164,879 A | 12/2000 | Krenzer | |
| 6,217,263 B1 | 4/2001 | Wiman et al. | |
| 6,234,726 B1 | 5/2001 | Okada et al. | |
| 6,315,504 B1 | 11/2001 | Sekiguchi et al. | |
| 6,652,203 B1 * | 11/2003 | Risen, Jr. | B23B 51/02 408/225 |
| 7,140,815 B2 * | 11/2006 | George | B23B 51/02 408/230 |
| 7,201,543 B2 | 4/2007 | Muhlfriedel et al. | |
| 7,237,986 B2 | 7/2007 | Anjanappa et al. | |
| 7,717,654 B2 | 5/2010 | Cirino | |
| 7,837,418 B2 | 11/2010 | Lang et al. | |
| 7,896,586 B2 | 3/2011 | Morgulis | |
| 8,550,756 B2 | 10/2013 | Borschert et al. | |
| 8,840,347 B2 | 9/2014 | Aare | |
| 8,979,445 B2 | 3/2015 | Sampath et al. | |
| 9,199,312 B2 | 12/2015 | Chen et al. | |
| 9,199,315 B2 | 12/2015 | Muhlfriedel et al. | |
| 9,731,358 B2 | 8/2017 | Allen et al. | |
| 2005/0053438 A1 * | 3/2005 | Wetzl | B23B 51/02 408/225 |
| 2006/0056930 A1 * | 3/2006 | Rompel | B23B 51/02 408/225 |
| 2006/0120814 A1 | 6/2006 | Lipohar et al. | |
| 2007/0081870 A1 | 4/2007 | Muhlfriedel et al. | |
| 2007/0253788 A1 * | 11/2007 | Miebach | B27G 15/00 408/230 |
| 2007/0274794 A1 | 11/2007 | Cirino | |
| 2009/0279965 A1 * | 11/2009 | Soittu | B23B 51/06 408/59 |
| 2011/0079445 A1 | 4/2011 | Nomura | |
| 2012/0230785 A1 | 9/2012 | Chen et al. | |
| 2013/0039709 A1 | 2/2013 | Goh et al. | |
| 2014/0356088 A1 * | 12/2014 | Santamarina | B23B 51/02 408/144 |
| 2017/0209942 A1 | 7/2017 | Chien et al. | |
| 2017/0326651 A1 | 11/2017 | Allen et al. | |
| 2017/0368613 A1 | 12/2017 | Straka et al. | |

FOREIGN PATENT DOCUMENTS

| | | |
|---|---|---|
| CN | 102205436 A | 10/2011 |
| CN | 202317168 U | 7/2012 |
| CN | 202336614 U | 7/2012 |
| CN | 102416494 B | 9/2013 |
| CN | 203292555 U | 11/2013 |
| CN | 203356677 U | 12/2013 |
| CN | 203409319 U | 1/2014 |
| CN | 203495300 U | 3/2014 |
| CN | 204295019 U | 4/2015 |
| CN | 205183873 U | 4/2016 |
| CN | 205254197 U | 5/2016 |
| CN | 205668086 U | 11/2016 |
| CN | 205764070 U | 12/2016 |
| CN | 205914806 U | 2/2017 |
| CN | 206083948 U | 4/2017 |
| CN | 107008952 A | 8/2017 |
| CN | 107186251 A | 9/2017 |
| CN | 107262785 A | 10/2017 |
| CN | 206653008 U | 11/2017 |
| CN | 206702276 U | 12/2017 |
| DE | 2933632 A1 | 2/1980 |
| DE | 4117486 02 | 12/1992 |
| DE | 102008029404 A1 | 12/2009 |
| EP | 2047932 B1 | 4/2009 |
| EP | 2441544 A1 | 4/2012 |
| GB | 2028190 A | 3/1980 |
| WO | 2012017645 A1 | 2/2012 |

\* cited by examiner

DRILL BIT

TECHNICAL FIELD

The present disclosure relates to drill bits.

BACKGROUND

Drill bits are generally used with power tools such as rotary drills or hammer-type drills to cut or carve holes into a material or surface. Drill bits are used to cut holes into a variety of materials such as brick, block, tile, metal, marble, concrete, plaster, wood, plastic, dry-wall, etc., or any combination thereof. Drill bits need to be versatile, but also need to be durable to withstand drilling in abrasive materials.

SUMMARY

In one embodiment, the disclosure provides a drill bit including a body having a first end, a second end opposite the first end, and an axis of rotation extending centrally through the body from the first end to the second end. The drill bit also includes a shank adjacent the second end. The shank is configured to couple to a tool. The drill bit further includes a cutting head adjacent the first end. The cutting head includes a pilot tip and a cutting portion. The cutting portion has first tip surfaces and second tip surfaces on opposite sides of the pilot tip. Each first tip surface extends radially outward from the pilot tip to a corresponding second tip surface. Each second tip surface extends from a corresponding first tip surface to an outer periphery of the body. The first tip surfaces define a first tip angle through the axis of rotation that is less than 180 degrees. The second tip surfaces define a second tip angle through the axis of rotation that is smaller than the first tip angle.

In another embodiment, the disclosure provides a method of manufacturing a drill bit. The method includes providing a piece of bar stock having a first end, a second end opposite the first end, and an axis of rotation extending centrally through the bar stock between the first and second ends. The method also includes cutting the first end of the bar stock to form a cone having a second tip angle measured through the axis of rotation, and further cutting the cone at the first end of the bar stock to form a pilot tip, first tip surfaces, and second tip surfaces. Each set of first and second tip surfaces is positioned on opposite sides of the pilot tip. The first tip surfaces define a first tip angle through the axis of rotation that is less than 180 degrees. The second tip surfaces define a second tip angle through the axis of rotation that is smaller than the first tip angle. The method further includes forming a flute in the bar stock between the first and second ends, and forming a shank at the second end of the bar stock. Optionally, further cutting the cone includes further cutting the cone to form the pilot tip with a tip and an outer periphery surface, the outer periphery surface tapering from the tip toward the axis of rotation to provide a radial relief surface. Optionally, further cutting the cone includes further cutting the cone to form the pilot tip with a tip and an outer periphery surface, the outer periphery surface tapering from the tip toward the axis of rotation to provide a radial relief surface. The method may further include coating the bar stock in a physical vapor deposition, or coating the bar stock in a rust preventative coating, or both. Forming the shank may include forming a hex shank.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
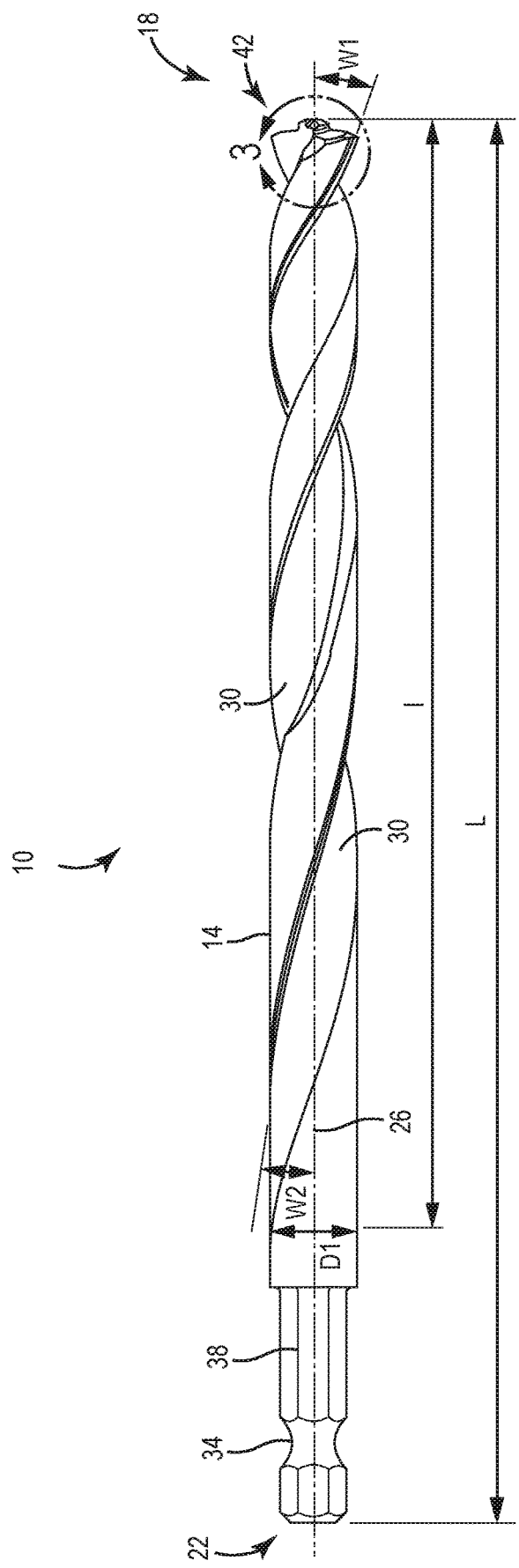
FIG. 1 is an elevational view of a drill bit.
Figure 2:
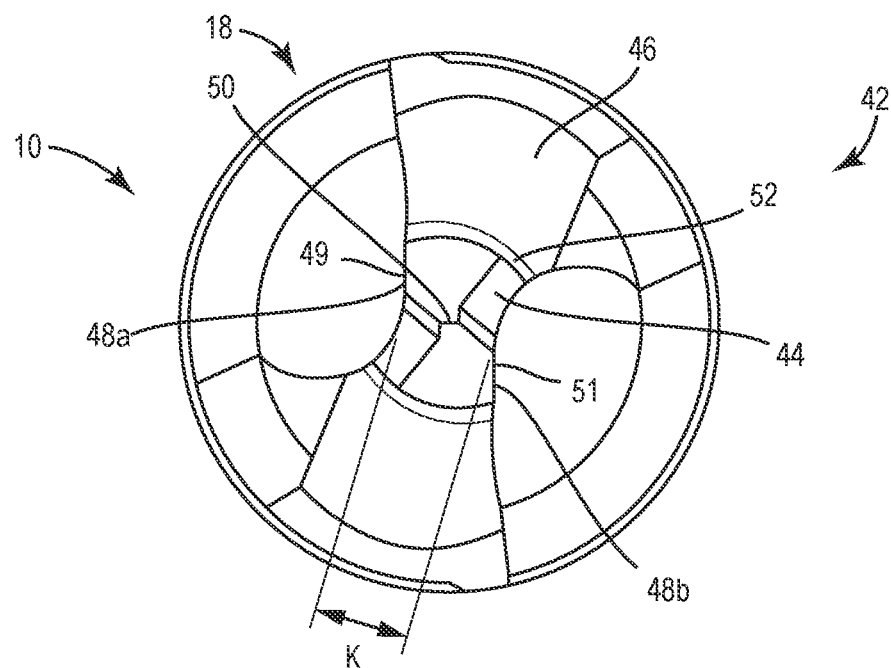
FIG. 2 is an end view of the drill bit of FIG. 1.
Figure 3:
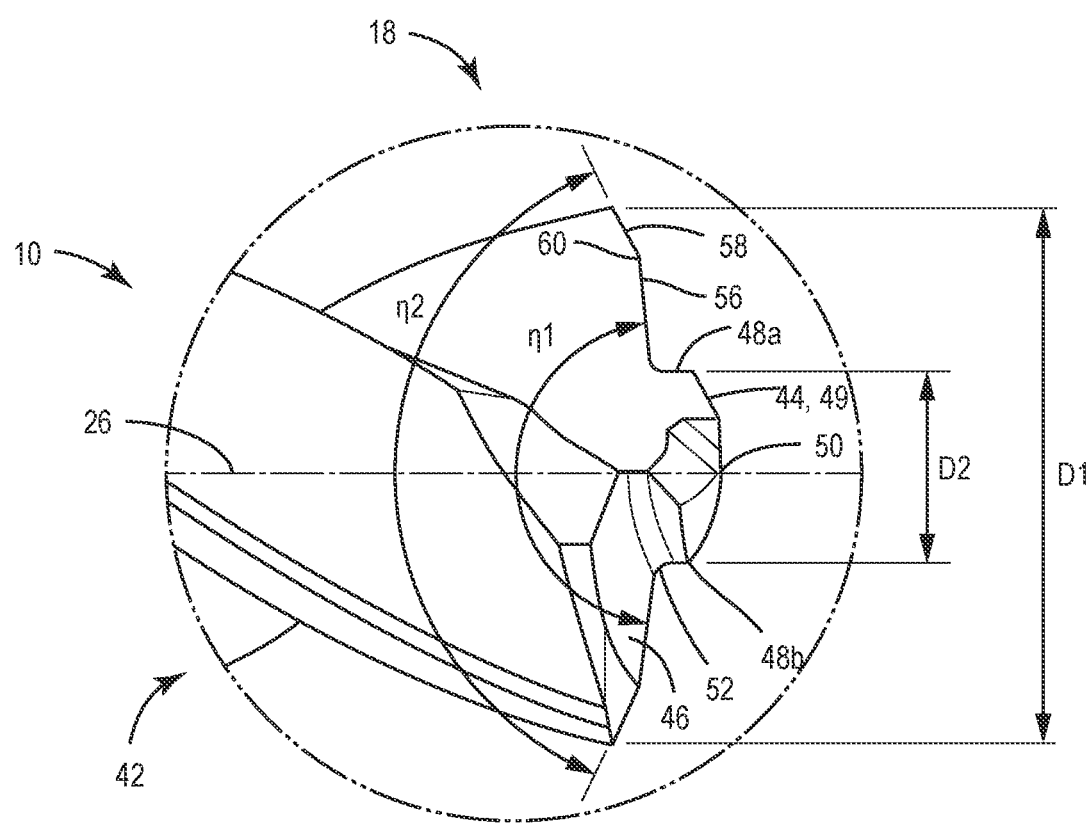
FIG. 3 is an enlarged side view of a cutting head of the drill bit of FIG. 1.

FIGS. 1-3 illustrate a drill bit 10 for use with a power tool, such as, for example, a drill, a driver drill, a screwdriver, and the like. The drill bit 10 may be used to cut holes or drill into a workpiece made out of brick, block, tile, metal, marble, concrete, plaster, wood, plastic, dry-wall, and the like. The illustrated drill bit 10 comes in a variety of sizes that correspond to the diameter of a hole to be created in a workpiece. For example, possible sizes of the drill bit 10 may be 3.2 mm, 6.4 mm, 9.5 mm, and 12.7 mm. In other embodiments, the drill bit 10 may be other sizes.

With reference to FIG. 1, the drill bit 10 includes a body 14 having a first end 18, a second end 22 opposite the first end 18, an axis of rotation 26 centrally positioned on the drill bit 10 and extending from the first end 18 to the second end 22, and one or more flutes 30. The first end 18 is a workpiece-engaging end. The second end 22 is configured to be received in a tool holder or chuck of a power tool. The drill bit 10 may come in a variety of different lengths L defined between the first end 18 and the second end 22. In some embodiments, the length L of the drill bit 10 may be based at least in part on the diameter of the drill bit 10. The length L of the drill bit 10 is in a range between 70 mm and 150 mm. An outer diameter D1 of the drill bit is in a range of 3 mm to 14 mm With continued reference to FIG. 1, the second end 22 of the drill bit 10 includes a shaft or shank 34 that is configured to be coupled to a tool. In the illustrated embodiment, the shank 34 is hex-shaped. In other embodiments, the shank 34 may have other suitable shapes to be received in a power tool. The shank 34 is approximately one sixth to one third the total length L of the drill bit 10. The shank 34 may include laser etching 38 indicating to the user the size of the drill bit 10. In some embodiments, the shank 34 may be integrally formed with a remainder of the drill bit 10. In other embodiments, the shank 34 may be welded to the remainder of the drill bit 10 or coupled using adhesive or other means.

In the illustrated embodiment, the drill bit 10 includes two flutes 30. In other embodiments, the drill bit 10 may include fewer or more flutes 30. The flutes 30 are helically wrapped around the body 14 of the drill bit 10 and extend from the first end 18 of the body 14 to the shank 34. Preferably, the flutes 30 extend at least half the length of the body 14. Even more preferably, the flutes 30 have a length l between 23 mm and 100 mm. The flutes 30 are helically wrapped around the body 14 at a variable helix angle. In other words, the angle at which the flutes 30 wrap about the body 14 change as the flutes 30 extend from the first end 18 to the shank 34. In the illustrated embodiment, a helix angle W1 of each flute 30 adjacent the first end 18 is larger than a helix angle W2 of each flute 30 adjacent the shank 34. Preferably, the helix angle W1 of each flute 30 adjacent the first end 18 is approximately 35 degrees, and the helix angle W2 of each flute 30 adjacent the shank 34 is between 15 degrees and 20 degrees. In some embodiments, the helix angles of the flutes 30 may gradually transition from the first helix angle W1 to the second helix angle W2. In further embodiments, the flutes 30 may have a constant helix angle.

With reference to FIGS. 2-3, the drill bit 10 further includes a cutting head 42 positioned at the first end 18 of the body 14. The cutting head 42 includes a pilot tip 44 and a cutting portion 46. In some embodiments, the cutting portion 46 may be referred to as a chip breaker. The pilot tip 44 extends axially away from the cutting portion 46 along the axis of rotation 26 and includes an outer diameter D2 (FIG. 3) that is smaller than the outer diameter D1 of the drill bit 10. As such, the cutting portion 46 extends radially further outwards from the axis of rotation 26 than the pilot tip 44. In the illustrated embodiment, the diameter D2 is approximately one third the diameter D1. Preferably, the diameter D2 is between 1.5 mm and 5 mm. The pilot tip 44 includes a first cutting edge 49, a second cutting 51, and a tip 50. The first and second cutting edges 49, 51 each define a respective outer peripheral surface 48a, 48b of the tip 50. The outer peripheral surfaces 48a, 48b taper from the tip 50 at a small angle relative to the axis of rotation 26 to provide a radial relief. In the illustrated embodiment, the angle is approximately 3 degrees. In other embodiments, the surfaces 48a, 48b may extend generally parallel to the axis of rotation 26. The surfaces 48a, 48b connect to the cutting portion 46 at a shoulder 52. In the illustrated embodiment, the shoulder 52 is a radiused or curved surface. In some embodiments, the shoulder 52 has a radius that is 0.5 mm or less. When the pilot tip 44 contacts a workpiece, the tip 50 creates a hole to guide the rest of the drill bit 10 into the workpiece.

As shown in FIG. 2, the drill bit 10 further includes a web K that is defined as the width between the two flutes 30. The web K extends the full length l of the flutes 30. In some embodiments, the web K tapers from the second end 22 to the first end 18. In other words, the web K increases in thickness from the first end 18 to the second end 22. In the illustrated embodiment, the length of the web K at the pilot tip 44 is approximately one sixth the diameter D1 of the drill bit 10. Preferably, the length of the web K at the pilot tip 44 is between 0.8 mm and 2.5 mm.

With reference to FIG. 3, the cutting portion 46 includes a first tip surface 56 and a second tip surface 58. The illustrated cutting portion 46 includes two first tip surfaces 56 and two second tip surfaces 58, each set of first and second tip surfaces 56, 58 positioned on one side of the pilot tip 44. In other words, each set of first and second tip surfaces 56, 58 is positioned on diametrically opposite sides of the axis of rotation 26 from one another. For simplicity, only one set of tip surfaces 56, 58 is described below. The other set of tip surfaces 56, 58 is substantially the same. In other embodiments, the cutting portion 46 may include more than two sets of tip surfaces. The sets of tip surfaces 56, 58 are separated by the flutes 30.

The first tip surface 56 extends from the outer periphery surface 48a of the pilot tip 44 to the second tip surface 58 to form a vertex 60, and the second tip surface 58 extends from the first tip surface 56 to the outer periphery of the body 14 of the drill bit 10. In other words, the first tip surface 56 extends away from the outer periphery surface 48a of the pilot tip 44 a distance, at which point the cutting portion 46 is further chamfered to the second tip surface 58. The second tip surface 58 extends from the ends of the first tip surface 56 to the ends of the diameter D1 of the body 14 of the drill bit 10.

The first tip surfaces 56 define a first tip angle $\eta 1$ measured through the axis of rotation 26. The first tip angle $\eta 1$ is an oblique angle. More particularly, the first tip angle $\eta 1$ is less than 180 degrees such that the first tip surfaces 56 are not parallel. The first tip angle $\eta 1$ may be within a range between 150 degrees and 180 degrees. In some embodiments, the first tip angle $\eta 1$ is within a range between 155 degrees and 165 degrees. In further embodiments, the first tip angle $\eta 1$ is 160 degrees.

The second tip surfaces 58 define a second tip angle $\eta 2$ measured through the axis of rotation 26. The second tip angle $\eta 2$ is smaller than the first tip angle $\eta 1$. For example, the second tip angle $\eta 2$ may be between 10% and 35% smaller than the first tip angle $\eta 1$. In some embodiments, the second tip angle $\eta 2$ may be about 15% smaller than the first tip angle $\eta 1$. The second tip angle $\eta 2$ may be within a range between 120 degrees and 150 degrees. In some embodiments, the second tip angle $\eta 2$ may be within a range between 130 degrees and 140 degrees. In further embodiments, the second tip angle $\eta 2$ is 135 degrees.

To manufacture the drill bit 10, a cylindrical bar stock rod of metal, preferably a durable steel alloy, is provided. First, the first end 18 is transformed into a gently sloping cone-shaped tip. To accomplish this, a machine (e.g., a computer numerical control machine) rotates the drill bit 10 rapidly about the axis of rotation 26 while a first machining tool cuts (e.g., grinds) the first end 18 of the rod at an angle forming a cone. Specifically, the first end 18 is cut to produce the second tip surfaces 58 at the second tip angle $\eta 2$ prior to forming the first tip surfaces 56. Next, a second machining tool cuts (e.g., grinds) a portion of the cone or second tip surfaces 58 while the drill bit 10 is rotated. In particular, the second machining tool cuts the cone of the rod at an oblique angle relative to the axis of rotation 26 to form the first tip surfaces 56 at the first tip angle $\eta 1$ which separates the pilot tip 44 from the second tip surfaces 58.

The machine stops spinning the drill bit 10 and moves it into position for cutting the flutes 30. A third machining tool is then angled obliquely relative to the drill bit 10. The third machining tool moves parallel to the axis of rotation 26 from the first end 18 to the second end 22 while the machine slowly rotates the drill bit 10 forming the helical flutes 30. Finally, the second end 22 of the drill bit 10 is grinded down by a fourth machining tool to form the hex shaped shank 34. In some embodiments, the flutes 30 and shank 34 may be formed prior to forming the tip surfaces 56, 58. In other, embodiments, the drill bit 10 may further be cut or grinded to form cutting edges, cutting tips, or other tip surfaces. In further embodiments, the machining tools may all be the same tool or all different tools. Additionally, the same machining tool may be used more than once.

Alternatively, in some embodiments, the first tip angle $\eta 1$ and the second tip angle $\eta 2$ may be formed at different magnitudes by separately grinding the tip surfaces 56, 58. For example, the cutting head 42 of the drill bit 10 may first be ground to form the second tip angle $\eta 2$, and then the drill bit 10 may be further ground to form the first tip angle $\eta 1$.

Providing the first tip surfaces 56 at a non-orthogonal angle relative to the axis of rotation 26 increases the cutting speed of the drill bit 10. In addition, providing a web K that tapers from the second end 22 to the first end 18 increases the durability of the drill bit 10.

In some embodiments, the drill bit 10 may be coated with a rust preventive coating that is applied to the entire drill bit 10 such as black oxide. In further embodiments, the drill bit 10 may be coated with a PVD (physical vapor deposition) coating, such as titanium-nitride coating.

Various features and advantages of the disclosure are set forth in the following claims.

What is claimed is:

1. A drill bit comprising:
    a body having a first end, a second end opposite the first end, and an axis of rotation extending centrally through the body from the first end to the second end;
    a shank adjacent the second end, the shank configured to couple to a tool; and
    a cutting head adjacent the first end, the cutting head including a pilot tip and a cutting portion, the cutting portion having linear first tip surfaces and linear second tip surfaces on opposite sides of the pilot tip, each first tip surface extending radially outward from the pilot tip to a corresponding second tip surface to form a vertex with the corresponding second tip surface, each second tip surface extending from a corresponding first tip surface to an outer periphery of the body, the first tip surfaces defining a first tip angle through the axis of rotation that is less than 180 degrees, the second tip surfaces defining a second tip angle through the axis of rotation that is smaller than the first tip angle;
    wherein the pilot tip includes a first cutting edge and a second cutting edge, the first cutting edge and the second cutting edge each defining an outer peripheral surface; and
    wherein the first cutting edge and the second cutting edge extend radially outward from the axis of rotation towards a respective outer peripheral surface, each respective outer peripheral surface extending generally parallel to the axis of rotation from each respective first and second cutting edges to each of the respective first tip surfaces, so as to form a step between the first and second cutting edges and their respective first tip surfaces.

2. The drill bit of claim 1, wherein the first tip angle is within a range between 150 degrees and 180 degrees, and wherein the second tip angle is within a range between 120 degrees and 150 degrees.

3. The drill bit of claim 2, wherein the first tip angle is 160 degrees, and wherein the second tip angle is 135 degrees.

4. The drill bit of claim 1, wherein the second tip angle is between 10% and 35% smaller than the first tip angle.

5. The drill bit of claim 4, wherein the second tip angle is approximately 15% smaller than the first tip angle.

6. The drill bit of claim 1, wherein the pilot tip extends axially away from the cutting portion.

7. The drill bit of claim 1, wherein the cutting portion extends radially further outwards from the axis of rotation than the pilot tip.

8. The drill bit of claim 1, wherein the body further includes flutes that extend at least partially between the first and second ends.

9. The drill bit of claim 8, wherein the body defines a web extending between the flutes.

10. The drill bit of claim 9, wherein the web increases in thickness from the first end to the second end.

11. The drill bit of claim 8, wherein the flutes are helically wrapped around the body.

12. The drill bit of claim 11, wherein the flutes are wrapped around the body at a variable helix angle.

13. The drill bit of claim 12, wherein the helix angle of the flutes at a position adjacent the first end of the body is between 18 degrees and 35 degrees, and wherein the helix angle of the flutes at a position adjacent the second end of the body is between 15 and 25 degrees.

14. The drill bit of claim 1, wherein the body is coated in a physical vapor deposition.

15. A method of manufacturing a drill bit, the method comprising:
    providing a piece of bar stock having a first end, a second end opposite the first end, and an axis of rotation extending centrally through the bar stock between the first and second ends;
    cutting the first end of the bar stock to form a cone having a second tip angle measured through the axis of rotation;
    further cutting the cone at the first end of the bar stock to form a pilot tip with a first cutting edge, a second cutting edge, linear first tip surfaces, and linear second tip surfaces, each set of first and second tip surfaces positioned on opposite sides of the pilot tip, each first tip surface extending radially outward from the pilot tip to a corresponding second tip surface to form a vertex with the corresponding second tip surface, the first tip surfaces defining a first tip angle through the axis of rotation that is less than 180 degrees, the second tip surfaces defining a second tip angle through the axis of rotation that is smaller than the first tip angle, the first cutting edge and the second cutting edge each defining an outer peripheral surface, the first cutting edge and the second cutting edge extend radially outward from the axis of rotation towards a respective outer peripheral surface, each respective outer peripheral surface extending generally parallel to the axis of rotation from each respective first and second cutting edges to each of the respective first tip surfaces, so as to form a step between the first and second cutting edges and their respective first tip surfaces;
    forming a flute in the bar stock between the first and second ends; and
    forming a shank at the second end of the bar stock.

16. The method of claim 15, further comprising coating the bar stock in a physical vapor deposition.

17. The method of claim 16, further comprising coating the bar stock in a rust preventative coating.

18. The method of claim 15, wherein forming the shank includes forming a hex shank.

* * * * *